May 21, 1929.  A. T. KELLER  1,713,699
PROCESS OF MAKING CAR WHEEL RIMS
Filed Oct. 18, 1921
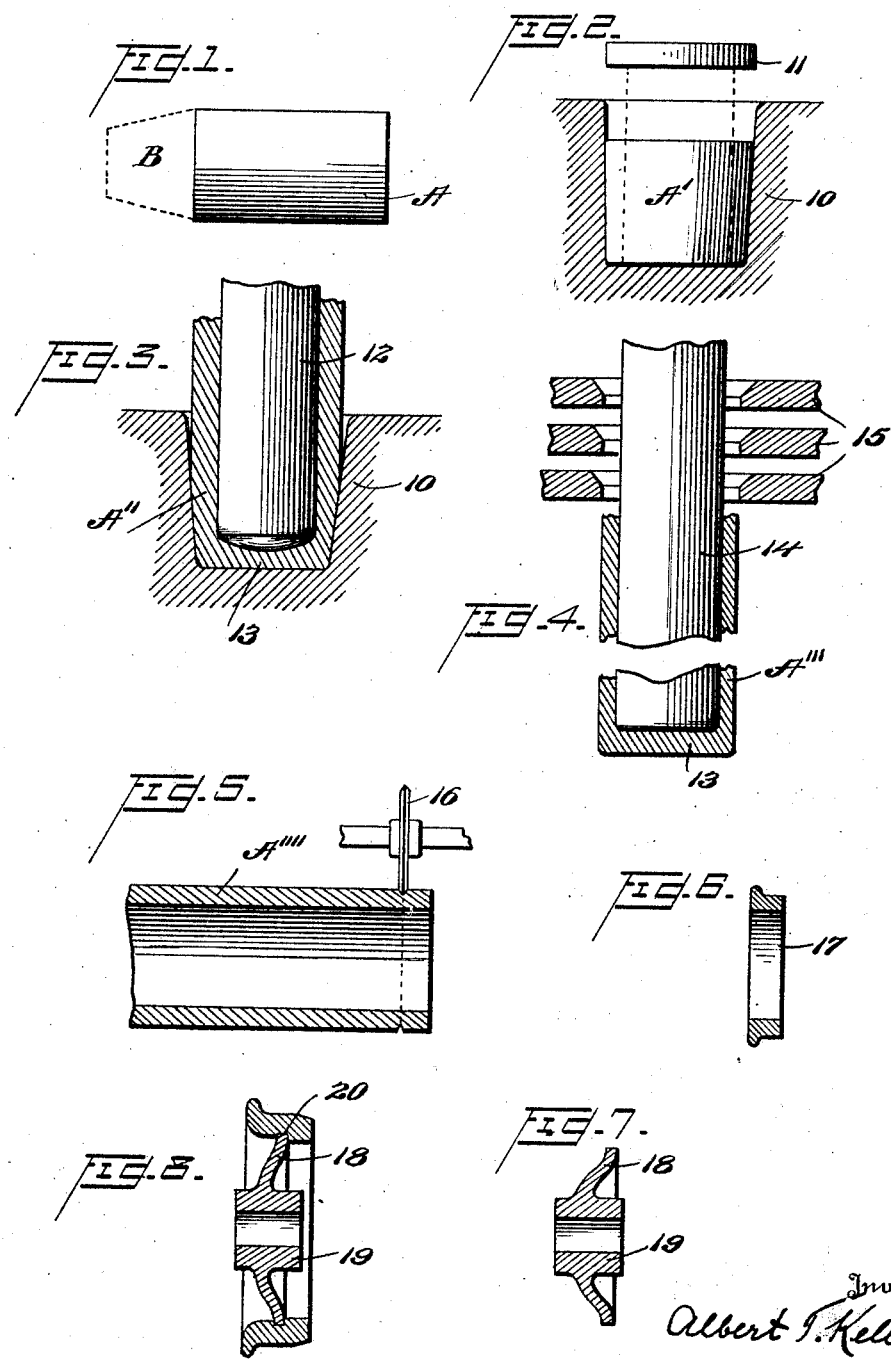

Patented May 21, 1929.

1,713,699

UNITED STATES PATENT OFFICE.

ALBERT T. KELLER, OF BETHLEHEM, PENNSYLVANIA, ASSIGNOR TO BETHLEHEM STEEL COMPANY, OF BETHLEHEM, PENNSYLVANIA, A CORPORATION OF PENNSYLVANIA.

PROCESS OF MAKING CAR-WHEEL RIMS.

Application filed October 18, 1921. Serial No. 508,469.

My invention relates to a process of making car wheels and tires or rims therefor.

It is the object of my invention to provide a process of making the tires or rims for such wheels by drawing a body of metal into tubular form, cutting said tube into rings, and then rolling the rings into the desired shape to form the tires. A further object is to provide a process for uniting the tires or rims with the inner portion of the wheels by forming such inner portions with a suitable hub and web and then expanding the web into a groove formed on the inner periphery of the tire or rim.

In the processes heretofore generally employed or proposed for the manufacture of car-wheel tires a ring of metal is produced and subsequently rolled into the proper shape to form a tire. Such processes however are open to various objections. The rings used are produced either from tubular ingots or solid ingots with the centers thereof punched out to form the rings, the ingots in either case being of a size to produce one tire or a plurality of tires as desired. Where individual ingots are used either solid or tubular, much care is required in the casting operation in order to avoid piping and segregation and other defects, and considerable loss of metal results in cutting away the discarded portions of the ingots. And with the solid ingots further loss results from punching the openings in the centers thereof to form the rings. In the case of multiple ingots the difficulties of casting are somewhat less but such ingots must be cut into blocks or, where tubular ingots are used, into rings which operation adds to the time and expense in producing the tires. Other difficulties lie in the fact that a large number of different sized molds is necessary to cover the range in size of tires and a considerable number of ingots must be cast at one time in order to use up an ordinary heat of metal. Furthermore when the rings are finally formed either from a solid or tubular ingot, they are composed of cast metal which receives little or no working except that taking place in the final rolling of the rings to form the tires. The metal in the tires is not therefore sufficiently worked to produce the best possible wear-resisting surface on the outer periphery of the tires.

The foregoing and other defects of prior processes are largely overcome by the present invention which is hereinafter set forth in detail.

In so far as the the present invention relates to the assembling of car-wheel tires with the inner portions of the wheels, it also possesses considerable advantage over the processes heretofore proposed or used. In such processes a groove is formed in the inner periphery of the tire which is then heated and compressed to interlock with the web on the inner portion of the wheel. I have found that by forming a combined hub and web with the web arranged at an acute angle to the hub and then pressing the web into position more nearly at right angles to the hub, the web can be easily and securely expanded into the groove, in the inner periphery of the tire which process is simpler and less expensive and less troublesome than the former procedure above mentioned.

My improved process both as to the manner of forming the tires and the manner of assembling the tires with the other portions of the wheel is set forth in the following specification and illustrated more or less diagrammatically in the accompanying drawings forming a part of such specification and in which drawings:

Fig. 1 illustrates an ingot of metal which I propose to cast as the first step in producing the tires;

Fig. 2 illustrates diagrammatically the step of upsetting the ingot in a die to compress the same and slightly enlarge its diameter;

Fig. 3 illustrates a further step in the treatment of the ingot, this figure showing the ingot partially pierced by a plunger so as to form the same into a cup-shaped blank;

Fig. 4 illustrates a further step in the treatment of the blank by which it is finally reduced into tubular form having the desired diameter and the desired thickness of walls;

Fig. 5 illustrates in a diagrammatic way the process of cutting the drawn tubular blank into rings;

Fig. 6 shows in cross section one of the finished tires which is produced by rolling the rings;

Fig. 7 shows in cross section the shape of the inner portion of a wheel consisting of a hub and web, such portion of the wheel being forged or produced in any suitable manner;

Fig. 8 shows a finished wheel in which the flange of the inner portion of the wheel is expanded into a groove formed in the tire.

In carrying out my improved process in so far as it relates to the making of tires, I produce a drawn tubular member and cut the same transversely of its axis to form rings and roll such rings in the proper shape to form the tires. The tubular member is preferably made in the following manner. An ingot A, Figure 1, is cast of sufficient size to produce a plurality of tires, the upper part B, known as the "hot top" being cut off to eliminate defective metal. The ingot is then re-heated to a temperature of about 900 to 1200° C. and is placed in a die 10, Figure 2, and up-set in any suitable manner, as by a flat punch 11 operated from any suitable source of power. This operation decreases the height of the ingot and slightly increases its diameter, resulting in compressing and densifying the metal. The ingot as thus compressed is illustrated at A' in Figure 2. While confined in the die 10 and preferably without reheating, the ingot is partially pierced by a punch 12, Figure 3, and reduced to a cup-shaped blank A", Figure 3, having a bottom disk 13 sufficiently thick to withstand the subsequent drawing operations. This operation of partially piercing the ingot causes the metal to flow in a direction opposite the travel of the punch 12 and further works the inner and outer surfaces of the blank and compresses and refines the crystalline structure of the metal. The cup-shaped blank A" is now removed from the die 10, preferably reheated as before, and is placed on a punch 14 of a draw bench diagrammatically illustrated in Figure 4. The cradle of the draw bench has a plurality of circular dies 15 centered on the path of the axis of the punch 14, each successive die being of smaller diameter than the preceding one. The blank is passed through all the dies of the series, each die in turn reducing the overall diameter of the blank. After passing through one set of dies the blank may be slightly reheated and given a pass through a second and a third set of dies, each of smaller diameter than the preceding one until the blank has been elongated to the desired extent and the walls thereof reduced to the proper thickness for tires. The stroke of the draw punch 14 is such as to draw the blank to the desired length and the same is preferably made with a slight taper to facilitate stripping of the blank therefrom. The draw bench is preferably provided with suitable means for stripping the blank from the punch after each drawing operation. After the blank is sufficiently elongated and the walls thereof sufficiently reduced in thickness, as shown at A''', Figure 4, the bottom disk 13 is discarded and the resulting tubular member designated as A'''', Figure 5 is then cut into rings by means of any suitable cutter, such as that diagrammaticaly illustrated at 16 in Figure 5. The resulting rings are then rolled in any well known manner into the proper shape to form tires, as illustrated at 17 in Figure 6.

During the operation of producing the cylindrical member A'''' it is apparent that the metal will be thoroughly worked and that the operation of drawing the blank through the various dies will serve to radially forge the exterior surface of the tubular member. Such working and forging of metal greatly improves its physical properties so that the tubular member is thoroughly worked throughout and particularly on the exterior surface thereof with the result that rings cut therefrom are of particular value and utility in the formation of the tires, since the outer surface of the tire is the portion which receives the wear. The final operation of rolling the rings cut from the tubular member also serves to further work and densify the metal so that when the tires are finally shaped, the metal is worked to its best possible condition and the outer periphery of the tire is rendered as near wear-resistant as possible.

In forming the complete car-wheel as illustrated in Figure 8, I proceed in the following manner. A combined hub and web is first formed as shown in Figure 7, this being done by forging or pressing or in any other suitable way. The combined hub and web are so formed that the web 18 lies at an angle considerably less than a right angle to the axis of the hub 19. The tire, which may be made by my process heretofore described or in any other suitable manner, is provided on its inner periphery with a groove 20 adapted to receive the web 18. In order to assemble the tire with the combined web and hub, the parts are suitably heated and brought together and the web is pressed into a position more nearly at right angles with the axis of the hub. This results in expanding the web so that its outer edge is forced into the groove 20 of the tire, with the result that the parts are securely locked together. By the foregoing procedure it becomes unnecessary to compress the tire and the operation of combining the tire with the inner portion of the wheel is therefore simpler and more rapid and less expensive than that heretofore employed. While I have described my invention in connection with the manufacture of car wheels, it will be obvious to those skilled in the art that the method or process of producing the rim herein disclosed is susceptible of wider application. For example, rims of this character might be used in connection with built-up wheels or rotors in general.

Having thus described the invention what is claimed as new and desired to be secured by Letters Patent is:

The process of making car wheel rims, which consists in compressing a highly heated ingot of steel, partially piercing while still hot, drawing through a series of dies while in a heated state to form a tube, cutting said tube into rings, and rolling said rings to form car wheel rims.

In testimony whereof I hereunto affix my signature.

ALBERT T. KELLER.